Aug. 7, 1962

A. M. SHOOK 3,048,415

PIPE JOINT ASSEMBLY

Filed Dec. 5, 1960

*INVENTOR.*
ADAM M. SHOOK

BY *Gust & Irish*

ATTORNEYS

Aug. 7, 1962 A. M. SHOOK 3,048,415
PIPE JOINT ASSEMBLY
Filed Dec. 5, 1960 2 Sheets-Sheet 2
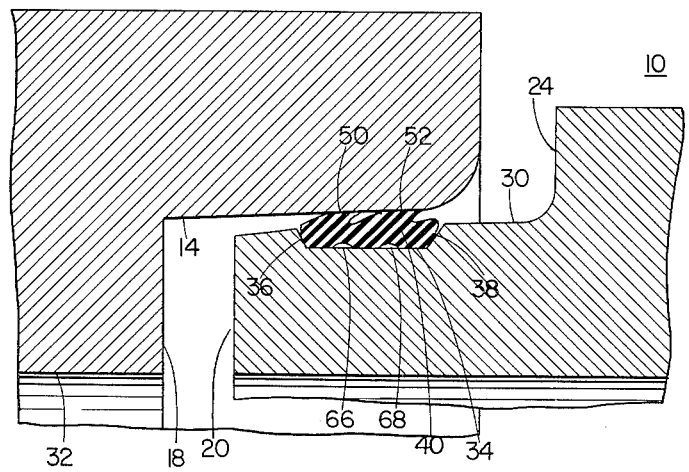
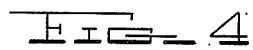
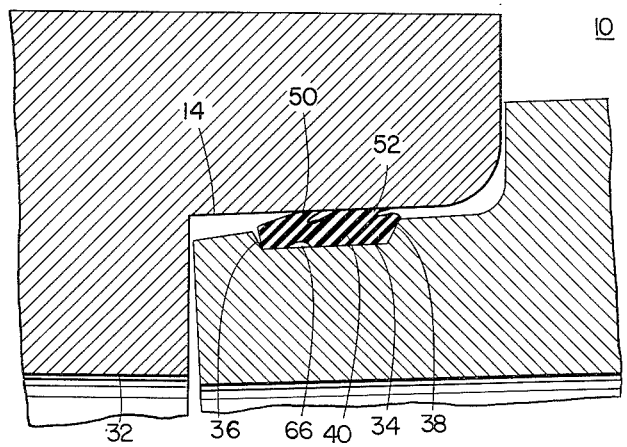
INVENTOR.
ADAM M. SHOOK
BY Gust & Irish
ATTORNEYS

United States Patent Office 3,048,415
Patented Aug. 7, 1962

3,048,415
PIPE JOINT ASSEMBLY
Adam M. Shook, Fort Wayne, Ind., assignor to Press Seal Gasket Corporation, Fort Wayne, Ind., a corporation of Indiana
Filed Dec. 5, 1960, Ser. No. 73,626
6 Claims. (Cl. 277—170)

This invention relates generally to joint assemblies for pipe of the type comprising cooperable male and female pipe ends, and more particularly to pipe joint assemblies including a resilient gasket for sealing the joints against fluid infiltration and exfiltration.

Low pressure pipe, generally formed of cast concrete, is widely employed for sewer lines. Infiltration of water and dirt into a sewer line through faulty joints may cause overflow of the sewers during rainy periods, increases the cost of treating sewage, causes cave-ins due to soil being washed into the pipe lines through the joints, and frequently causes settlement of the pipe into caved-in pockets thus reducing its capacity and ultimately causing complete collapse of the pipe and stoppage of the line. Exfiltration of sewage through defective pipe points is obviously undesirable.

In the past, the joints of low pressure pipe lines were merely grouted with mortar however, shifting of the pipe line caused by movement of the soil, backfilling by heavy earthmoving equipment at the time the pipe line was installed, freezing, etc. tended to open the pipe line joint thus in turn causing the undesirable infiltration and exfiltration.

In order to eliminate infiltration and exfiltration of liquids, solids, dirt, etc. through the joints of low pressure sewer pipe, many types of resilient gaskets and cooperating joint configurations have been employed in order to seal the joint. Such resilient gaskets typically seal by deformation upon the assembly of the male end of one pipe section into the cooperating female end of the adjacent pipe section and are flexible to permit considerable shifting of the pipe to take place and further to permit intentional misalignment of adjacent pipe sections in order to form a radius in the pipe line. In one common form of gasketed pipe joint construction, the gasket is applied over the front end of the male portion of the pipe section prior to laying of the pipe and while such an arrangement generally provides adequate sealing when properly installed, it has been found that in many cases, the gasket inadvertently comes off of the male end of the pipe prior to installation. In order to eliminate this difficulty, another common form of gasketed pipe line construction employs a groove in the male end of the pipe section with an annular gasket seated therein; it is this general type of construction with which the present invention is concerned.

It has been found that the best seal is provided by a confined-compression type gasket, i.e. an arrangement in which the gasket, when the joint is completely assembled, is compressed and completely confined both radially and axially. This confined-compression has in the past been provided by means of a resilient O-ring gasket seated in a groove in the male end of the pipe. While the seal provided by such an arrangement is excellent when the joint is properly assembled, it is difficult to assemble the O-ring on the male end of the pipe, there is a tendency for the O-ring to roll out of the joint when it is assembled or disassembled, and the seal provided by the O-ring is impaired when adjacent pipe sections are misaligned to any considerable degree. It has been further proposed to employ an annular gasket of generally rectangular solid cross-section in an annular groove in the male end of the pipe, and again while such an arrangement provides a satisfactory seal when the joint is properly assembled, the joint is quite rigid and misalignment of adjacent pipe sections in order to provide a radius in the pipe line is difficult to achieve. Other gaskets having resilient fingers and cored out portions have been employed, however, such arrangements rely entirely upon the resilient properties of the gasket material for effecting the seal and it has been found that the seal is impaired as the gasket material deteriorates over the course of time. It is therefore desirable to provide a gasketed pipe joint construction of the type employing an annular gasket seated in an annular groove in the male end of the pipe in which the gasket provides a seal of the confined-compression type with the gasket nevertheless possessing sufficient resilient properties to permit considerable misalignment of adjacent pipe sections without adversely effecting the seal.

It is accordingly an object of my invention to provide an improved pipe joint assembly.

Another object of my invention is to provide an improved pipe joint assembly incorporating an annular resilient gasket seated in an annular groove in the male end of the pipe.

A further object of my invention is to provide an improved pipe joint construction employing a resilient gasket of the confined-compression type which has sufficient resilient properties to provide a good seal despite substantial misalignment of adjacent pipe sections.

A still further object of my invention is to provide an improved annular gasket, particularly suited for sealing pipe joints.

In accordance with the broader aspects of my invention, I provide a pair of cooperable male and female pipe members, the male member having an outer annular surface and the female member having an inner annular surface defining an annular space with the annular surface of the male member when the joint is assembled. The annular surface of the male member has a relatively wide and shallow annular groove formed therein with its bottom surface being substantially flat. A preformed annular self-supporting gasket of flexible resilient material is provided, the gasket having a solid cross-section. The gasket comprises an annular base portion with a radial height generally the same as the depth of the groove, and two annular wedge portions each having a generally triangular cross-section joined to the base portion and extending radially outwardly therefrom. The wedge portions are axially joined end-to-end and extend axially across the base portion. Each of the wedge portions has one side facing the front end of the male member and inclined outwardly and rearwardly and its other side facing the rear end of the male member and inclined outwardly and forwardly, the one side of the wedge portions being longer than the other side. The wedge portions have a radial height substantially greater than that of the base portion and the radial thickness of the annular space. The base portion of the gasket is seated in the groove in the male member with its annular surface sealingly engaging the bottom surface of the groove. With this arrangement, the wedge portions engage the inner annular surface of the female member resiliently deforming downwardly when assembly of the joint is initiated, the wedge portions and the base portion being compressed between the inner surface of the female member and the bottom surface of the groove as assembly of the joint is continued causing the resilient material of which the gasket is formed to cold-flow and the gasket substantially to fill the groove and the annular section of the space concentric with the groove, the gasket being placed in compression over its entire axial length and being confined between the inner annular surface of the female member and the bottom surface of the groove on the one hand, and between the sides of the groove on the other hand when the joint is completely assembled to provide a tight seal for the joint.

Further objects and features of my invention will become apparent by reference to the following description and the accompanying drawing and the features of novelty which characterize my invention will be pointed out with particularity in the claims annexed and forming a part of the specification.

In the drawings:

FIG. 2 is a fragmentary cross-sectional view of the same type ends and gasket member as in FIG. 1 showing the joint partially assembled;

FIG. 4 is a fragmentary cross-sectional view similar to FIG. 3 but showing the two pipe sections respectively misaligned.

Figure 1:
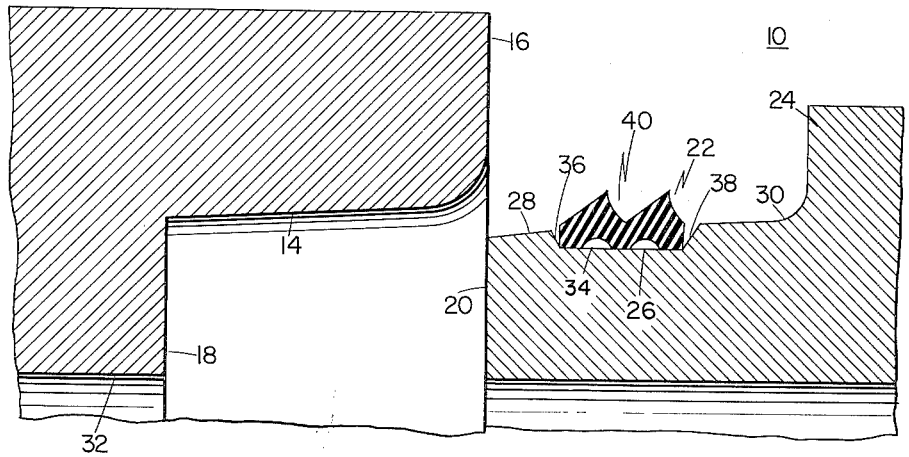
FIG. 1 is a fragmentary cross-sectional view showing the male and female ends of two adjacent pipe sections in separated relationship with the male end having an annular gasket member thereon in accordance with my invention.

Referring now to the figures of the drawing, there are shown the male and female ends 10 and 12 respectively of two adjacent sections of cast concrete low pressure pipe of the type employed for sewer line construction. Female end 12 has an inner annular surface 14 which tapers inwardly and rearwardly from front end 16 to rear end 18. Male end 10 has a front end 20, an outer annular surface 22 which tapers outwardly and rearwardly, and a rear end wall 24. A shallow relatively wide annular groove 26 is formed in the annular surface 22 and divides the same into a forward annular surface portion 28 and a rear annular surface portion 30; the rear annular surface portion 30 preferably has substantially the same taper as the inner annular surface 14 of the female member 12 and the forward annular surface 28 preferably has a somewhat greater taper, as shown. Pipe sections 10 and 12 are respectively provided with an inner bore 32.

Annular groove 26 has a substantially flat bottom surface 34 preferably substantially parallel with the axis of the pipe sections 10 and 12. The front side 36 of groove 26 tapers outwardly and forwardly and the rear side 38 tapers outwardly and rearwardly, as shown.

In order to provide a seal for the joint formed by the pipe sections 10 and 12 to prevent infiltration and/or exfiltration of fluids, sand, solids, etc. into or out of the bore 32, I provide a preformed self-supporting annular gasket member 40 formed of suitable resilient material, such as rubber. Gasket 40 comprises a base section 42 having a flat bottom surface 44 and sides 46 and 48 extending generally at right angles to base 44. Base 44 has an axial length substantially equal to the axial length of the bottom surface 34 of groove 26 and sides 46 and 48 of gasket 40 respectively have a radial height substantially equal to the depth of groove 26 at the two ends of bottom portion 34. A pair of wedge portions 50 and 52 are provided joined to the base portion 42 and extending radially outwardly therefrom, the wedge portions 50 and 52 being axially joined end-to-end and extending completely across the base portion 42, as shown.

Figure 5:
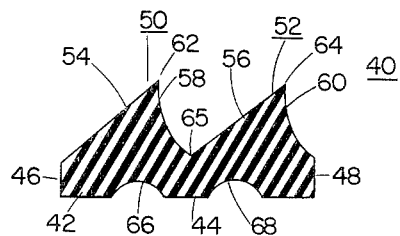
FIG. 5 is an enlarged cross-sectional view of the improved gasket member of my invention.

Wedge portions 50 and 52 respectively have front sides 54 and 56 which face forwardly, i.e. toward end 20 of male member 10, the sides 54 and 56 being inclined outwardly and rearwardly. Wedge portions 50 and 52 further have rear sides 58 and 60 which face rearwardly, i.e. toward the rear wall 24 of male member 10 and which are inclined outwardly and forwardly. Forward and rear sides 54, 58 and 56, 60 of wedge portions 50 and 52 are respectively joined at apices 62 and 64, the rearward side 58 of wedge portion 50 and the forward side 56 of wedge portion 52 being joined, as at 65, the forward side 54 of wedge portion 52 being joined to side 46 of base portion 42, and the rearward side 60 of wedge portion 52 being joined to the side 48 of wedge portion 52. As seen in FIGS. 1 and 5, the rearward sides 58 and 60 of wedge portions 50 and 52 are inwardly curved with a radius which is preferably generally equal to the radial height of wedge portions 50 and 52 above base portion 42. A pair of annular grooves 66 and 68 are formed in the bottom surface 44 of base portion 42 respectively under wedge portions 50 and 52, as shown.

Figure 3:
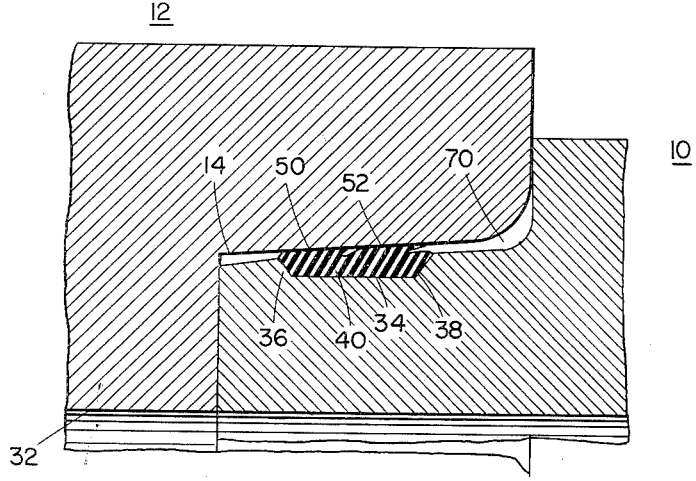
FIG. 3 is a fragmentary cross-sectional view showing the joint of FIGS. 1 and 2 completely assembled.

As seen in FIG. 1, gasket 40 is seated in annular groove 26 with the inner annular surface 44 of base portion 42 sealingly engaging the bottom surfaces 34 of groove 26 and it will be observed that prior to assembly of the joint, base portion 42 has substantially the same radial height as the depth of groove 26. It will also be seen that prior to assembly of the joint, the radial height of wedge portions 50 and 52 is substantially greater than the radial height of base portion 42 and also substantially greater than the radial thickness of the annular space 70 defined between inner annular surface 14 of female member 12 and the outer annular surface 22 of male member 10 when the joint is assembled as seen in FIG. 3.

Referring now to FIG. 2, it will be seen that when assembly of male member 10 within female member 12 is initiated, wedge portions 50 and 52 of gasket member 40 engage the inner annular surface 14 of female member 12 and are resiliently deformed downwardly by virtue of the inwardly curved sides 58 and 60. As the male member 10 is pushed home to the assembled position of the joint as shown in FIG. 3, the radial thickness of the annular space 70 progressively diminishes thus compressing wedge portions 50 and 52 and base portion 42 between the inner annular surface 14 of female member 12 and the bottom surface 34 of groove 26 thus in turn causing the resilient material of which the gasket is formed to cold-flow so that the gasket completely fills the annular groove 26, the gasket being compressed between inner annular surface 14 of female member 12 and the bottom surface 34 of groove 26 and confined between sides 36 and 38 of the groove 26, as seen in FIG. 3, it being observed that the cold-flow of the material resulting from the compression of the gasket has eliminated annular grooves 66 and 68.

Referring now to FIG. 4, it will be seen that when the male member 10 is misaligned with respect to the female member 12 due to its resilient properties, one of the wedge portions 50, 52 will resiliently move outwardly to continue to exert sealing pressure against the inner annular surface 14 of female member 12, thus insuring that the seal is maintained, the other wedge portion 52 remaining in compression between inner annular surface 14 and the bottom surface 34 of groove 26; it being understood that the situation will be reversed at the diametrically opposite side of the pipe, i.e. there wedge portion 50 will remain compressed with the wedge portion 52 resiliently moving outwardly to maintain the seal.

It will be readily seen that provision of two wedge-shaped portions integrally joined to a single base portion affords maximum gasket interference and the confined-compression type of seal when the joint is assembled, but nevertheless permits ready assembly of the joint by virtue of the initial resilient deformation of the wedge portions. Further, it will be readily seen that the resilient character of the wedge portions 50 and 52 permits considerable annular deflection of one pipe section with respect to the other and the imposition of substantial shear loads upon the gasket without adversely affecting the sealing action. Thus, while I have provided a considerable degree of resilience which permits both intentional and accidental misalignment of adjacent pipe sections, nevertheless when the joint is assembled, the gasket is compressed between the inner annular surface of the female member and the bottom surface of the groove and confined between the sides of the groove for providing a positive confined-compression seal against the infiltration and exfiltration.

In a typical bell and spigot concrete pipe construction employing my invention, the pipe having an inside diameter of twelve (12) inches and a wall thickness of two and one-eighth (2⅛) inches, with the annular inner surface 14 of female end 12 being two and one-half (2½) inches long with a two degree (2°) taper and with the outer annular surface 22 of male pipe member 10 being likewise two and one-half (2½) inches long with portion 30 having a two degree (2°) taper and portion 28 having an eight degree (8°) taper, annular groove 26 is one (1) inch wide having a depth of one-eighth (⅛) inch at end 36 and a depth of five-thirty second (5/32) inch at end 38. In this assembly, gasket member 40 is one (1) inch wide with a normal (unstretched) circumference of thirty-six (36) inches. Here, side 46 was one-eighth (⅛) inch high, side 48 was five-thirty second (5/32) inch high, and wedge portions 50 and 52 were respectively one-half (½) inch wide at their bases where joined to base section 42. Here, the overall height of gasket 40 at apices 62 and 64 of wedge portions 50 and 52 was seven-sixteenth (7/16) inches, the sides 58 and 60 had a five-sixteenth (5/16) inch radius and apices 62 and 64 were respectively one-eighth (⅛) inch rearwardly from point 65 and rear side 48. Grooves 66 and 68 were respectively of one-eighth (⅛) inch radius with their center lines being respectively five-sixteenth (5/16) inch from sides 46 and 48. Gasket member 40 was formed of a natural rubber polymer although it is readily apparent that co-polymers of butadiene and styrene, or a blend of both or any other suitable resilient gasket material may be employed. It will be readily seen that while my invention finds particular utility in connection with cast concrete pipe or machine-made concrete pipe for sewer lines, it is also suitable for use with cast iron, steel, ceramic or clay pipe.

While I have illustrated and described a specific embodiment of my invention, further modifications and improvements will appear to those skilled in the art, and I desire therefore in the appended claims to cover all modifications which do not depart from the spirit and scope of my invention.

What is claimed is:

1. A pipe joint assembly comprising: cooperable male and female pipe members, said male member having an outer annular surface, said female member having an inner annular surface defining an annular space with said annular surface of said male member when said joint is assembled, said annular surface of said male member having a relatively wide and shallow annular groove formed therein with its bottom surface being substantially flat; and a preformed annular self-supporting gasket of flexible resilient material having a solid cross-section, said gasket comprising an annular base portion with a radial height generally the same as the depth of said groove, said base portion having a flat bottom surface and sides respectively joining said bottom surface and perpendicular thereto, and two substantially identical annular wedge portions each having a generally triangular cross-section integrally joined to said base portion and extending radially outwardly therefrom, said wedge portions being axially joined end-to-end extending axially across said base portion and respectively joining said sides thereof each wedge portion having one side facing the front end of said male member and inclined outwardly and rearwardly and its other side facing the rear end of said male member and inclined outwardly and forwardly, said one and other sides of each of said wedge portions joining to define a point, the one sides of said wedge portions being longer than the other sides, said wedge portions having a radial height substantially greater than the height of said base portion and the radial thickness of said annular space, the radial heights of said wedge portions being substantially equal; said base portion of said gasket being seated in said groove with its inner annular surface sealingly engaging said bottom surface thereof, said wedge portions engaging said inner annular surface of said female member and resiliently deforming downwardly when assembly of said joint is initiated, said wedge portions and base portion being compressed between said inner surface of said female member and said bottom surface of said groove as assembly of said joint is continued causing said resilient material to cold-flow and said gasket substantially to fill said groove and the annular section of said space concentric with said groove and placing said gasket in compression over its entire axial length when said joint is completely assembled to provide a tight seal for said joint.

2. A pipe joint assembly comprising; cooperable male and female pipe members, said male member having an outer annular surface, said female member having an inner annular surface defining an annular space with said annular surface of said male member when said joint is assembled, said annular surface of said male member having a relatively wide and shallow annular groove formed therein with its front side inclined outwardly and forwardly, its rear side inclined outwardly and rearwardly and its bottom surface substantially flat; and a preformed annular self-supporting gasket of flexible resilient material having a solid cross-section, said gasket comprising an annular base portion with a radial height generally the same as the depth of said groove, with its inner annular surface having an axial length substantially the same as the axial length of said bottom surface of said groove, and with its sides being substantially perpendicular to its inner annular surface, and two substantially identical annular wedge portions each having a generally triangular cross-section joined to said base portion and extending radially outwardly therefrom, each wedge portion having one side facing the front end of said male member and inclined outwardly and rearwardly and its other side facing the rear end of said male member and inclined outwardly and forwardly, the one sides of said wedge portions being longer than the other sides, the one side of the forward wedge portion joining the forward side of said base portion and the other side of the rearward wedge portion joining the rear side of said base portion, the other side of the forward wedge portion joining the one side of the rearward wedge portion, said one and other sides of each of said wedge portions joining to define a point, said wedge portions having a radial height substantially greater than the height of said base portion and the radial thickness of said annular space, the radial heights of said wedge portions being substantially equal; said base portion of said gasket being seated in said groove with its inner annular surface sealingly engaging said bottom surface thereof, said wedge portions engaging said inner annular surface of said female member and resiliently deforming downwardly when assembly of said joint is initiated, said wedge portions and base portion being compressed between said inner surface of said female member and said bottom surface of said groove as assembly of said joint is continued causing said resilient material to cold-flow and said gasket substantially to fill said groove and the annular section of said space concentric with said groove and placing said gasket in compression over its entire axial length when said joint is completely assembled to provide a tight seal of said joint.

3. The combination of claim 1 wherein the other sides of said wedge portions are slightly curved inwardly, and wherein the inner annular surface of said base portion has two annular grooves formed therein respectively under said wedge portions.

4. A pipe joint assembly comprising: cooperable male and female pipe members, said male member having an outer annular surface which tapers outwardly and rearwardly, said female member having an inner annular surface which tapers substantially uniformly inwardly and rearwardly, said annular surfaces of said male and female members defining an annular space, said annular surface of said male member having a relatively wide and shallow annular groove formed therein and spaced rearwardly from the front end of said male member, said groove having its bottom surface substantially flat and generally parallel with the axis of said male member, the portion of said outer surface of said male member rearwardly of said groove having generally the same taper as said inner annular surface of said female member, the portion of said outer surface of said male member forwardly of said groove having a greater taper than said inner annular surface of said female member, said groove having its front side inclined outwardly and forwardly and its rear side inclined outwardly and rearwardly; and a preformed annular self-supporting gasket of flexible resilient material having a solid cross-section, said gasket comprising an annular base portion with its inner annular surface having an axial length substantially the same as the axial length of said bottom surface of said groove and with its sides being substantially perpendicular to its inner annular surface, the front and rear sides of said base portion respectively having a height generally equal to the depth of said groove at the front and rear ends of said bottom surface thereof, and two substantially identical annular wedge portions each having a generally triangular cross-section joined to said base portion and extending radially outwardly therefrom, each wedge portion having one side facing the front end of said male member and inclined outwardly and rearwardly and its other side facing the rear end of said male member and inclined outwardly and forwardly, the one side of the forward wedge portion joining the forward side of the base portion and the other side of the rearward wedge portion joining the rear side of said base portion, the other side of the forward wedge portion joining the one side of the rearward wedge portion, said one and other sides of each of said wedge portions joining to define a point, said wedge portions having a radial height substantially greater than the height of said base portion and the radial thickness of said annular space, the radial heights of said wedge portions from said inner annular surface to the apices of said wedge portions being substantially equal, the other sides of said wedge portions being curved inwardly with a radius generally equal to the height of said wedge portions, the inner annular surface of said base portion having two annular grooves formed therein respectively under said wedge portions, said base portion of said gasket being seated in said groove with its inner annular surface sealingly engaging said bottom surface thereof, said wedge portions engaging said inner annular surface of said female member and resiliently deforming downwardly when assembly of said joint is initiated, said wedge portions and base portion being compressed between said inner surface of said female member and said bottom surface of said groove as assembly of said joint is continued causing said resilient material to cold-flow and said gasket substantially to fill said groove and the annular section of said space concentric with said groove and placing said gasket in compression over its entire axial length when said joint is completely assembled to provide a tight seal for said joint.

5. For use in sealing the joints of cooperable male and female pipe members against infiltration and exfiltration; a preformed annular self-supporting gasket member of flexible resilient material having a solid cross-section and adapted to be seated in an annular groove formed in said male pipe member, said gasket member comprising an annular base portion having a flat bottom surface and sides respectively joining said bottom surface and substantially perpendicular thereto, and two substantially identical annular wedge portions each having a generally triangular cross-section integrally joined to said base portion and extending radially outwardly therefrom, said wedge portions being axially joined end-to-end extending axially across said base portion and respectively joining said sides thereof, each wedge portion having one side inclined outwardly and toward one side of said base portion and its other side inclined outwardly and toward the other side of said base portion, the one sides of said wedge portions being longer than the other sides, said one and other sides of each of said wedge portions joining to define a point, said wedge portions having a radial height substantially greater than the height of said base portion, the radial heights of said wedge portions being substantially equal.

6. The gasket of claim 5 wherein the other sides of said wedge portions are slightly curved inwardly with a radius generally equal to the radial height of said wedge portions, and wherein the inner annular surface of said base portion has two annular grooves formed therein respectively under said wedge portions.

References Cited in the file of this patent
UNITED STATES PATENTS

| | | |
|---|---|---|
| 2,271,777 | Nathan | Feb. 3, 1942 |
| 2,477,533 | Whiting | July 26, 1949 |
| 2,615,741 | Nathan | Oct. 28, 1952 |
| 2,643,147 | Funkhouser et al. | June 23, 1953 |
| 2,882,073 | James | Apr. 14, 1959 |

OTHER REFERENCES

Ser. No. 293,149, Boissou (A.P.C.), published May 25, 1943.